United States Patent
Fan et al.

(10) Patent No.: US 7,954,989 B2
(45) Date of Patent: Jun. 7, 2011

(54) BACKLIGHT MODULE WITH DIFFUSING PARTICLES AND PRISM REFRACTIVE STRUCTURE

(75) Inventors: Fu-Cheng Fan, Hsin-Chu (TW); Yi-Hsuan Lan, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 226 days.

(21) Appl. No.: 12/340,765

(22) Filed: Dec. 22, 2008

(65) Prior Publication Data

US 2010/0053939 A1  Mar. 4, 2010

(30) Foreign Application Priority Data

Aug. 28, 2008  (TW) ................ 97132953 A

(51) Int. Cl.
*F21V 7/04* (2006.01)
*F21V 8/00* (2006.01)
*F21V 5/02* (2006.01)
(52) U.S. Cl. ............ 362/610; 362/558; 362/616
(58) Field of Classification Search .......... 362/608–610, 362/621, 622, 558, 616
See application file for complete search history.

(56) References Cited

U.S. PATENT DOCUMENTS

| | | | |
|---|---|---|---|
| 6,447,133 B1 * | 9/2002 | Eschke et al. | 362/629 |
| 6,909,480 B2 * | 6/2005 | Hiraishi et al. | 349/112 |
| 6,979,095 B2 * | 12/2005 | Min et al. | 362/611 |
| 7,018,085 B2 * | 3/2006 | Lee et al. | 362/610 |
| 7,097,339 B2 * | 8/2006 | Chou et al. | 362/612 |
| 7,122,843 B2 | 10/2006 | Kahen | |
| 7,128,459 B2 * | 10/2006 | Igarashi et al. | 362/621 |
| 7,223,006 B2 * | 5/2007 | Sugiura | 362/616 |
| 7,309,154 B2 * | 12/2007 | Ohkawa | 362/615 |
| 2006/0285356 A1 * | 12/2006 | Tseng | 362/608 |
| 2007/0109463 A1 | 5/2007 | Hutchins | |
| 2007/0171671 A1 | 7/2007 | Kurokawa | |
| 2007/0278951 A1 | 12/2007 | Koo | |
| 2008/0049280 A1 | 2/2008 | Lee | |

FOREIGN PATENT DOCUMENTS

| | | |
|---|---|---|
| CN | 1942788 A | 4/2007 |
| CN | 2898855 Y | 5/2007 |
| CN | 101086581 A | 12/2007 |
| JP | 2006331683 A | 12/2006 |
| TW | I254821 | 5/2006 |

* cited by examiner

*Primary Examiner* — Alan Cariaso
(74) *Attorney, Agent, or Firm* — Winston Hsu; Scott Margo

(57) ABSTRACT

A backlight module includes a frame, a diffuser, a first light source, and a light guiding plate. The diffuser is disposed in the frame. A plurality of diffusing particles is doped into the diffuser. The refractive index of the plurality of diffusing particles is less than that of the diffuser. Furthermore, the diffuser has a first light entrance surface and a light exit surface. The first light source is disposed in a long-axial direction of the diffuser and is located at a side of the first light entrance surface. The light guide plate is disposed at a side of the light exit surface.

26 Claims, 9 Drawing Sheets

BACKLIGHT MODULE WITH DIFFUSING PARTICLES AND PRISM REFRACTIVE STRUCTURE

BACKGROUND OF THE INVENTION

1. Field of the Invention

The present invention relates to a back light module, and more specifically, to a backlight module with a diffusing particle structure.

2. Description of the Prior Art

Since liquid crystal molecules do not produce light themselves, a common method for driving an LCD to display images involves utilizing a backlight module to provide light with sufficient brightness and uniform distribution to the LCD. Therefore, a backlight module is one of the major components of an LCD. A traditional backlight module uses a cold cathode fluorescent lamp (CCFL) or an LED (Light Emitting Diode) as a light source. Both CCFL light sources and LED light sources have respective advantages and drawbacks. For example, a CCFL light source has an advantage of high brightness, but its color temperature is only about 4800K, thereby limiting color performance of the LCD. On the other hand, an LED light source has advantages of high color saturation, vivid color gamut, and long life. However, for an LED, a control problem occurs due to mixing of natural light. Furthermore, a display problem known as a "Hot Spot" is caused by an emitting angle of the LED. As mentioned above, the applications of the CCFL light source and the LED light source are limited due to the said drawbacks. Therefore, another enhanced method of utilizing a laser as a light source of a backlight module is available. In this method, light with ultra-high color saturation and ultra-vivid color gamut may be achieved through coherence and monochromaticity of the laser, so that color performance of the LCD may be increased accordingly.

In the prior art, a common method of utilizing a laser as a light source of a backlight module is to use a fiber-optic tube for conducting a laser beam emitted from a laser light source. Please refer to FIG. 1, which is a diagram of a backlight module 10 with a laser light source according to the prior art. The backlight module 10 comprises a laser light source 12, a fiber-optic tube 14, a fluorescent layer 16, and a light guide plate 18. As shown in FIG. 1, a plurality of groove structures 20 is formed inside the fiber-optic tube 14. As a result, the laser beam may be incident to the fluorescent layer 16 via being totally reflected by the inner wall of the fiber-optic tube 14 and reflected by the groove structures 20 in FIG. 1. After the laser beam passes through the fluorescent layer 16, the light guide plate 18 may receive a processed laser beam so that subsequent light processing procedures may continue. However, when the laser beam is reflected by the groove structures 20, scattering of the laser beam may occur at the same time so as to cause loss of light, thereby causing poor uniformity and low coupling efficiency of the light beam incident to the light guide plate 18.

SUMMARY OF THE INVENTION

Therefore, the present invention provides a backlight module with a diffusing particle structure. The backlight module disposes a diffuser doped with diffusing particles in a specific concentration at a side of a light guide plate. Via being scattered by the diffusing particles and reflected by the frame, coupling efficiency and uniformity of light incident to a light guide plate may be increased so as to solve the said problems.

The present invention provides a backlight module comprising a frame; a diffuser disposed in the frame, the diffuser having a first light entrance surface and a light exit surface; a plurality of diffusing particles doped into the diffuser, a refractive index of the plurality of diffusing particles being less than that of the diffuser; a first light source disposed in a long-axial direction of the diffuser and located at a side of the first light entrance surface; and a light guide plate disposed at a side of the light exit surface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
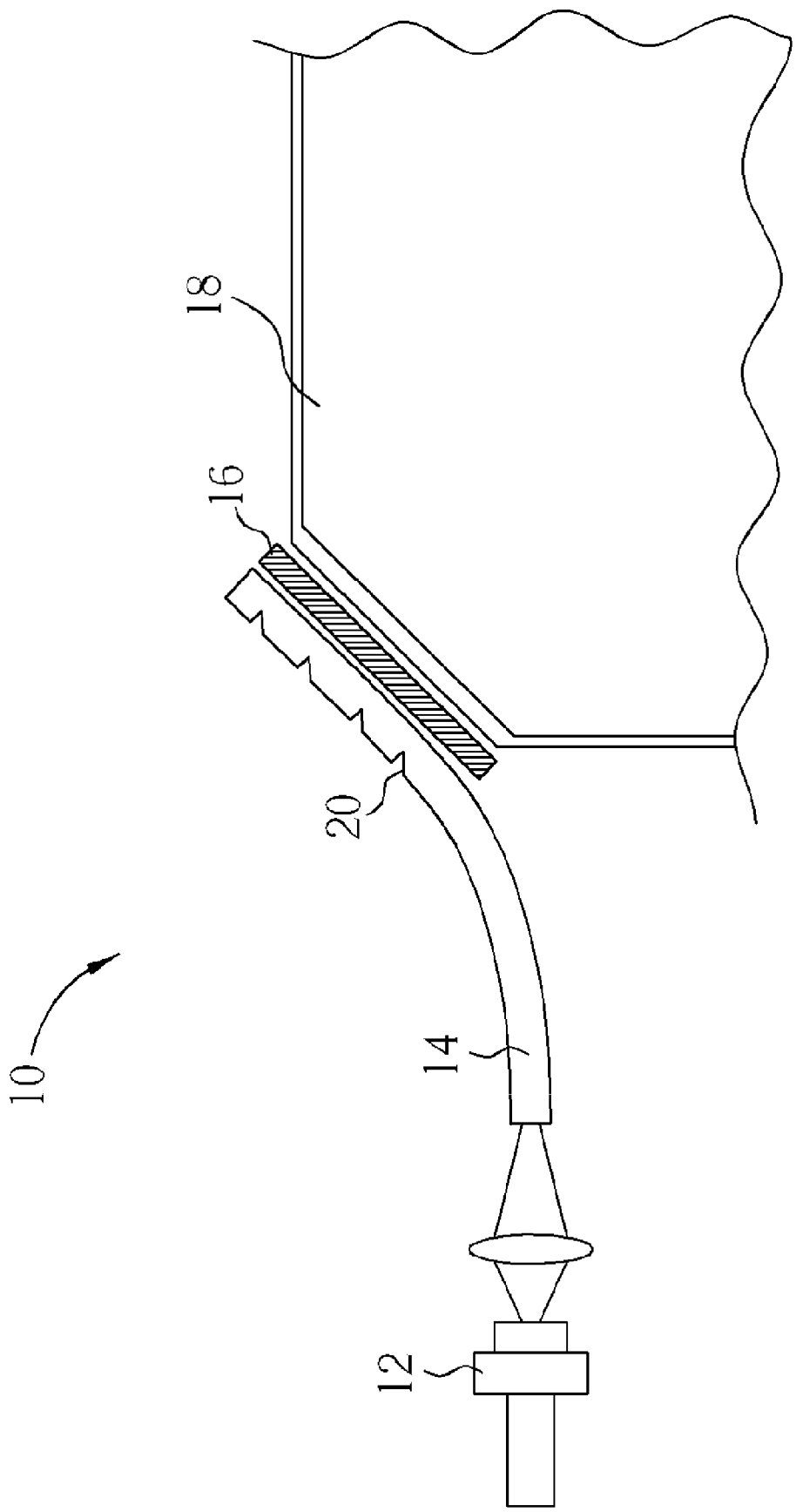
FIG. 1 is a diagram of the backlight module with the laser light source according to the prior art.
Figure 2:
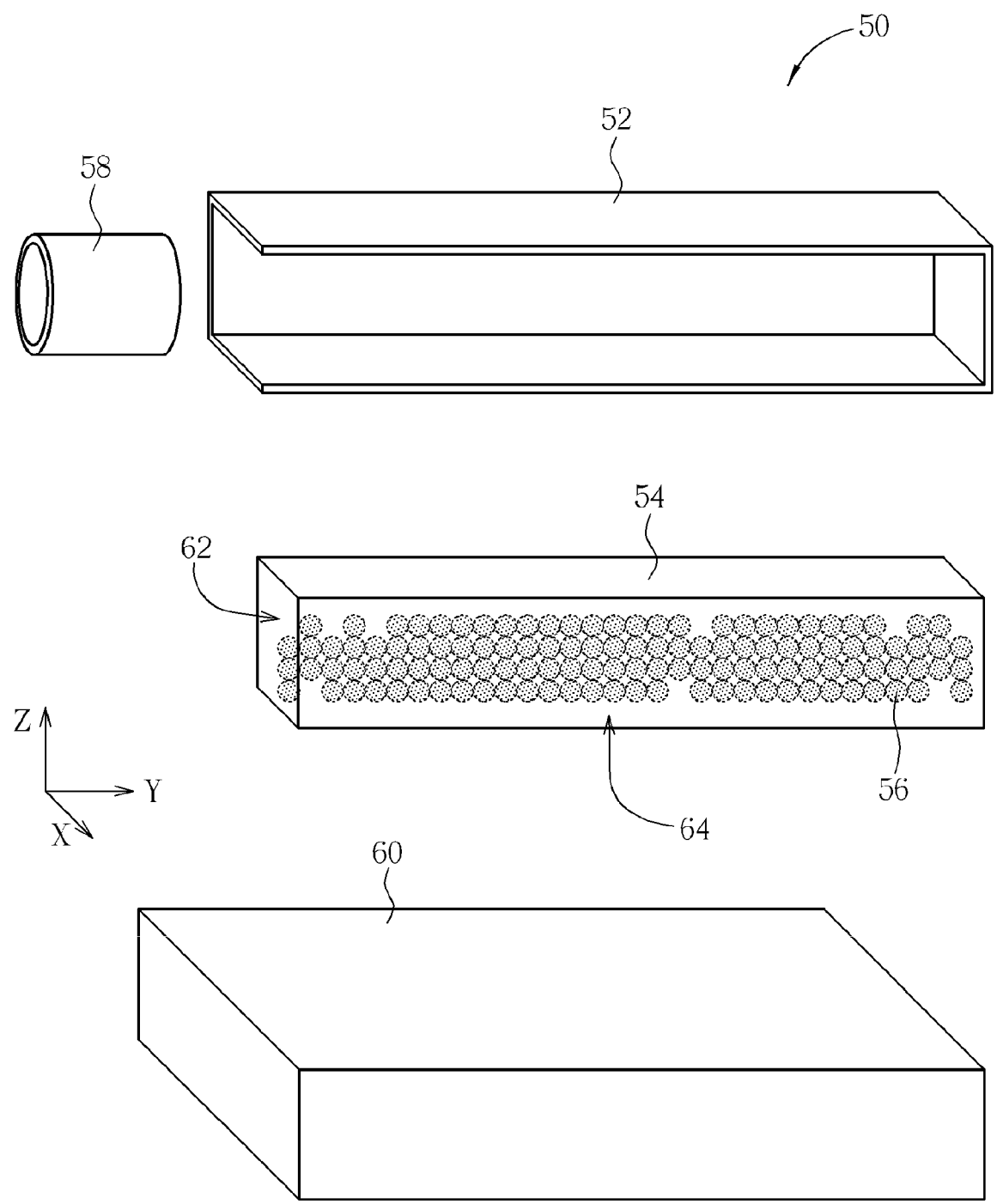
FIG. 2 is an exploded diagram of the backlight module according to the first embodiment of the present invention.
Figure 3:
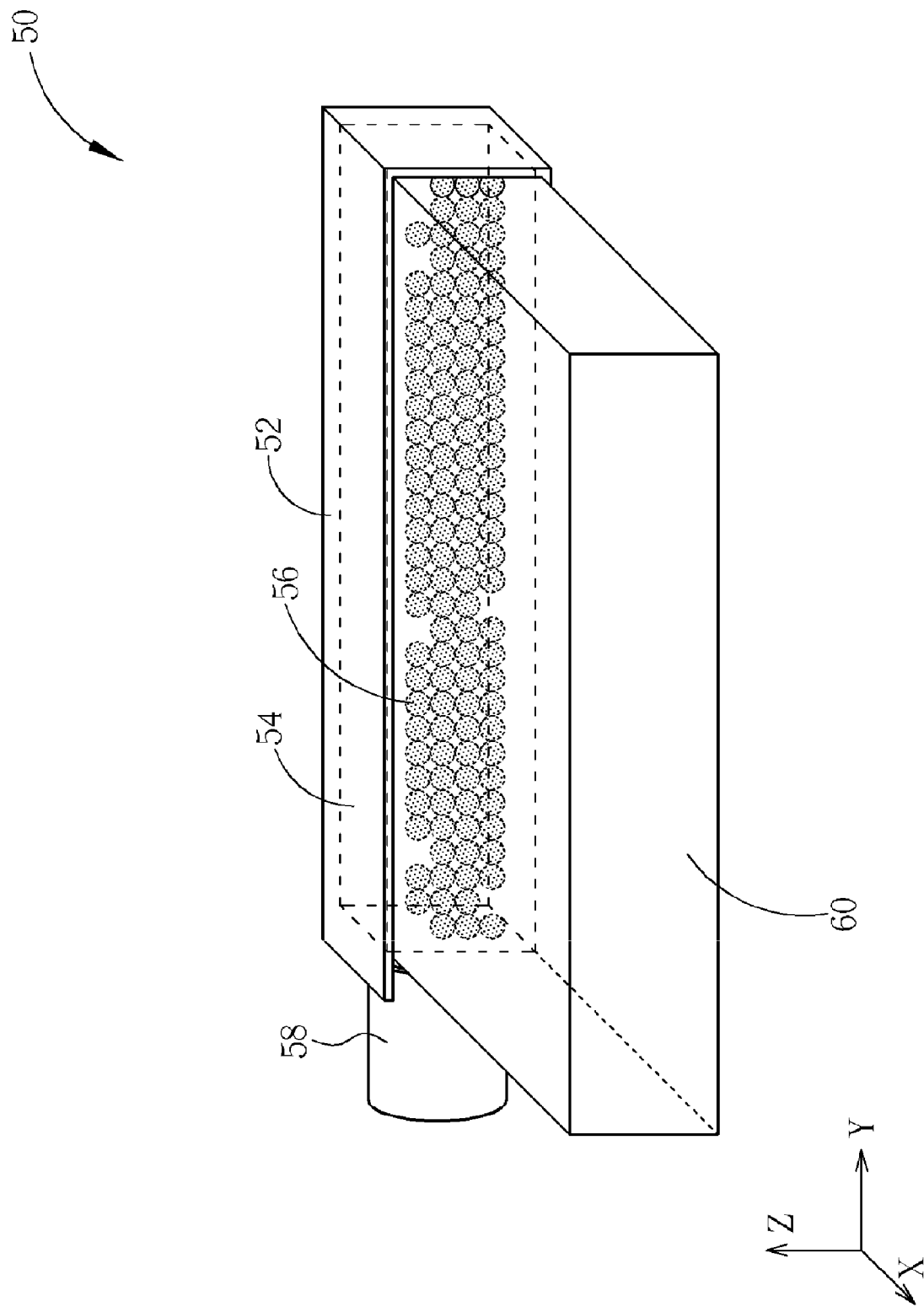
FIG. 3 is an assembly diagram of the backlight module in FIG. 1.
Figure 4:
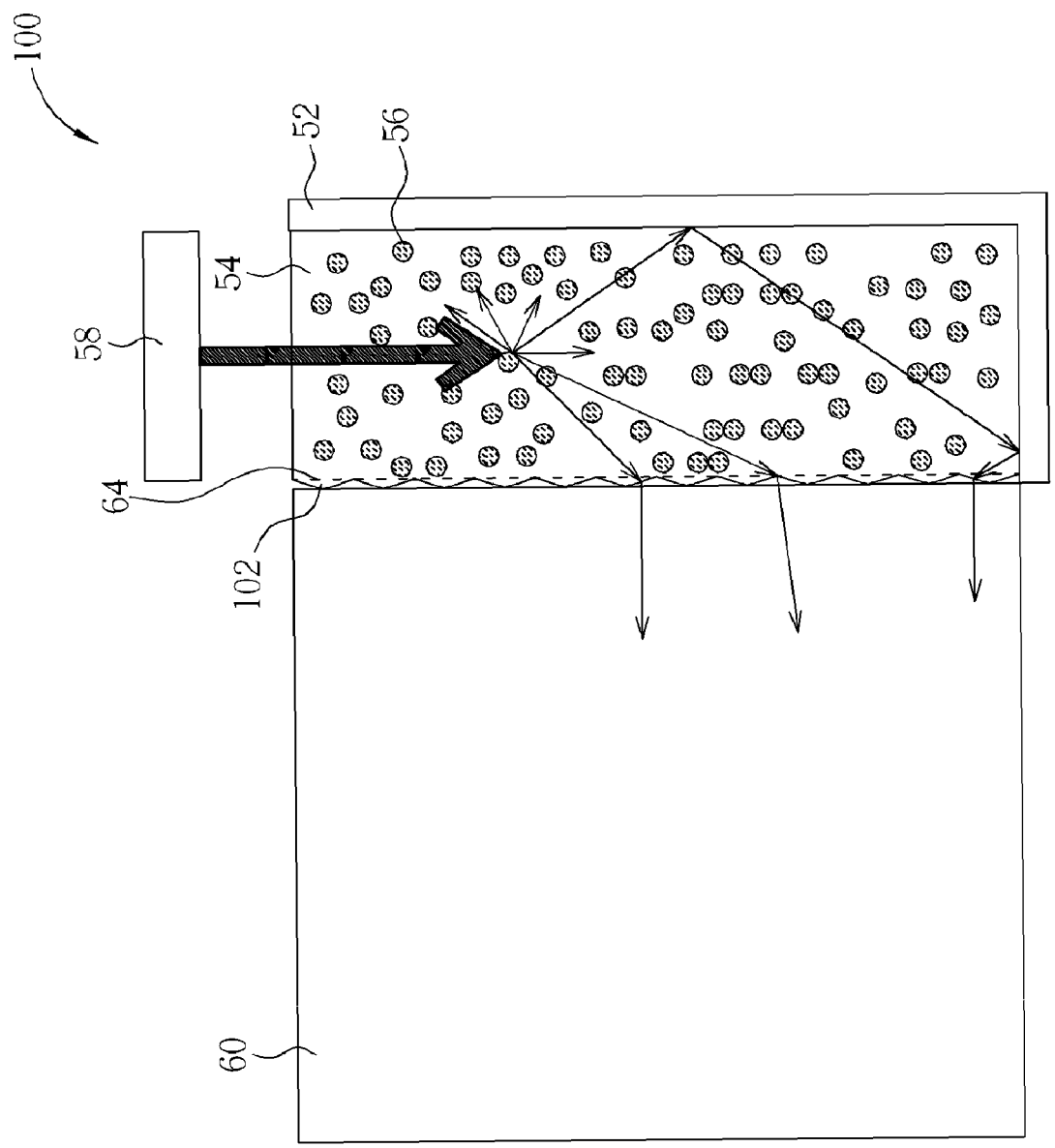
FIG. 4 is an enlarged top view of the inner structure of the backlight module according to the second embodiment of the present invention.

Please refer to FIG. 2 and FIG. 3. FIG. 2 is an exploded diagram of a backlight module 50 according to a first embodiment of the present invention. FIG. 3 is an assembly diagram of the backlight module 50 in FIG. 2. The backlight module 50 comprises a frame 52, a diffuser 54, a plurality of diffusing particles 56, a first light source 58, and a light guide plate 60. The inner wall of the frame 52 is a reflective surface for reflecting light incident to the inner wall of the frame 52. The diffuser 54 is disposed in the frame 52. The diffuser 54 is made of acrylic material. The refractive index of the diffuser 54 is substantially between 1.49 and 1.6. The diffuser 54 has a first light entrance surface 62 and a light exit surface 64 (as shown in FIG. 2). A normal direction of the first light entrance surface 62 is substantially parallel to a long-axial direction (Y-axis direction in FIG. 2) of the diffuser 54, and a normal direction (X-axis direction in FIG. 2) of the light exit surface 64 is substantially perpendicular to the long-axial direction of the diffuser 54. The plurality of diffusing particles 56 is doped into the diffuser 54. The doping method involves a common manufacturing process, such as UV curing, thermal curing, injection molding, extruction process and so forth. In this embodiment, the concentration of the diffusing particles 56 doped into the diffuser 54 is preferably 0.1%. A diameter of each diffusing particle 56 may be not uniform. The diameter of each diffusing particle 56 is substantially between 3 μm and 12 μm so as to increase the randomness of the plurality of diffusing particles 56 in the diffuser 54. As a result, color uniformity and luminance uniformity of the light emitted from the diffuser 54 are increased accordingly. Furthermore, the plurality of diffusing particles 56 is also made of acrylic material. The refractive indexes of the diffusing particles 56 are substantially between 1.41 and 1.49. When the refractive index of the diffuser 54 is equal to 1.49, the refractive indexes of the diffusing particles 56 are preferably equal to 1.41. And when the refractive index of the diffuser 54 is equal to 1.6, the refractive indexes of the diffusing particles 56 are preferably equal to 1.49. In other words, the refractive indexes of the diffusing particles 56 are less than that of the diffuser 54 in the present invention. The first light source 58 is disposed on the long-axis direction of the diffuser 54 and is located at a side of the first light entrance surface 62. The first light source 58 may preferably be a laser light source or an RGB LED light source. The light guide plate 60 is disposed at a side of the light exit surface 64. Further, please refer to FIG. 4. FIG. 4 is an enlarged top view of an inner structure of a backlight module 100 according to a second embodiment of the present invention. Components mentioned in both the first and second embodiments represent components with similar functions or similar positions. The difference between the backlight module 50 and the backlight module 100 is design of a prism refractive structure. As FIG. 4 shows, a continuous prism refractive structure 102 is formed on the light exit surface 64 of the diffuser 54 for increasing light coupling efficiency of the first light source 58 relative to the light guide plate 60. A vertex angle of the continuous prism refractive structure is substantially between 140° and 160°. Furthermore, the said diffuser 54 and the light guide plate 60 may be monolithically formed in an injection molding manner, or may be manufactured respectively first, then disposed at the corresponding locations respectively. As for which method is utilized, it depends on manufacturing process needs and practical applications.

Next, more detailed description for the light guiding process of the backlight module 100 is provided as follows. Please refer to FIG. 4. After the light generated from the first light source 58 enters the diffuser 54 along the long-axis direction of the diffuser 54 (Y-axis direction in FIG. 4), due to differences between the refractive indexes of the diffuser 54 and the diffusing particles 56, refraction and reflection of the light occur in the diffuser 54 when the light passes through the diffusing particles 56 in the diffuser 54, so as to make scattering of the light occur in the diffuser 54. Afterwards, via being scattered by the plurality of diffusing particles 56 and reflected by the inner wall of the frame 52 continuously, most of the light may reach the light exit surface 64. Subsequently, after the light passes through the continuous prism refractive structure 102, the occurring probability of total reflection of the light may be reduced accordingly. Thus, the light emitted from the first light source 58 to the diffuser 54 may enter the light guide plate 60 with high coupling efficiency (about 86%) and high uniformity (about 78%). Furthermore, the said method for making scattering of the light arise in the diffuser 54 may be not limited to a method utilizing differences between the refractive indexes of the diffuser 54 and the diffusing particles 56. For example, the plurality of diffusing particles 56 may also be red and green fluorescent grains for absorbing blue light so as to emit red and green light. Since the red and green light emitted from the red and green fluorescent grains is non-directional, this method may also make scattering of the light occur in the diffuser 54.

Figure 5:
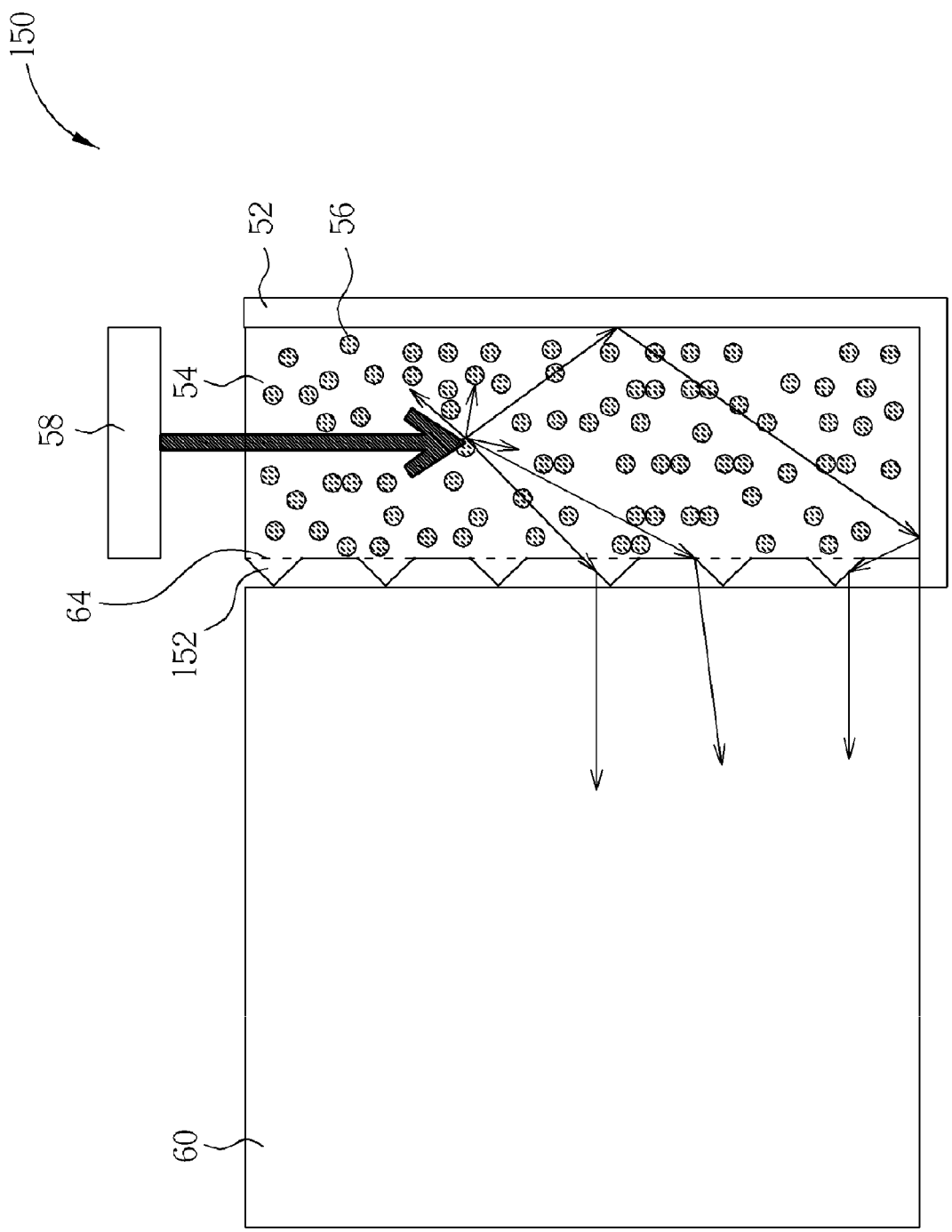
FIG. 5 is an enlarged top view of the inner structure of the backlight module according to the third embodiment of the present invention.
Figure 6:
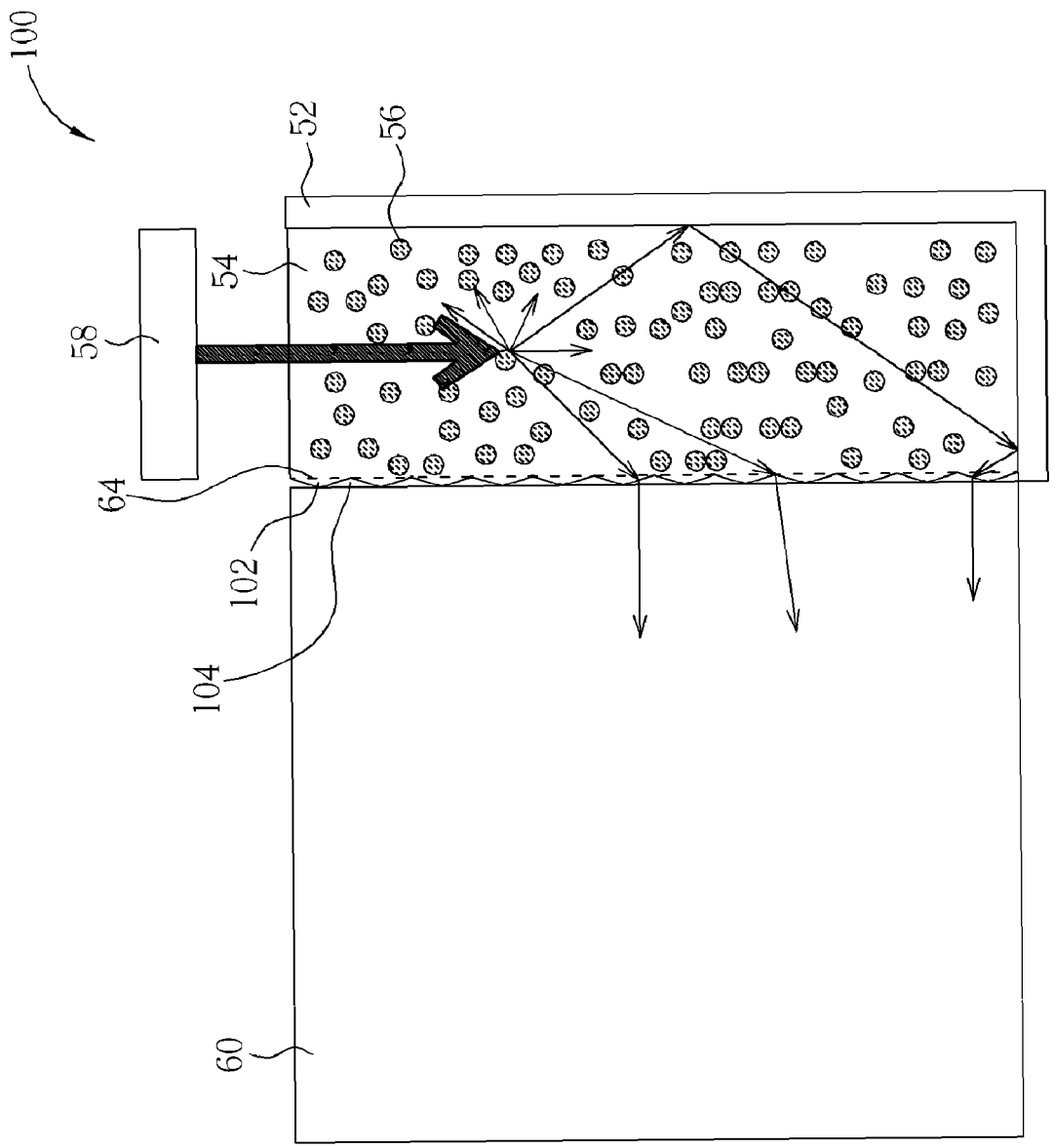
FIG. 6 is an enlarged top view of the inner structure of the backlight module in FIG. 4 with the air refractive layer.
Figure 7:
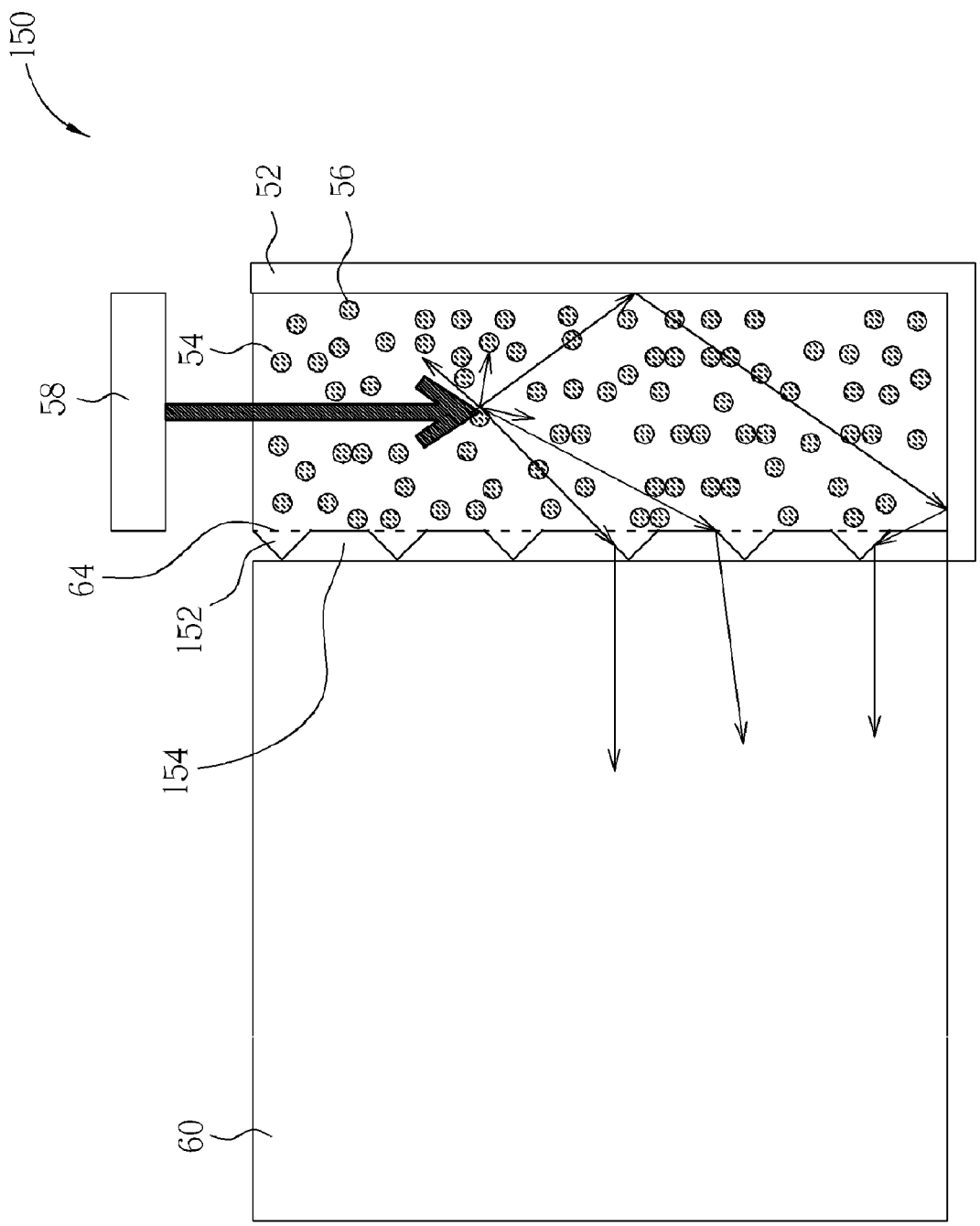
FIG. 7 is an enlarged top view of the inner structure of the backlight module in FIG. 5 with the air refractive layer.

It should be mentioned that the structure formed on the light exit surface 64 is not limited to the said continuous prism refractive structure. Other refractive structures for reducing the probability of total reflection of the light may also be utilized in the present invention. For example, please refer to FIG. 5. FIG. 5 is an enlarged top view of an inner structure of a backlight module 150 according to a third embodiment of the present invention. Components mentioned in both the second and third embodiments represent components with similar functions or similar positions, and the related description is therefore omitted herein. The difference between the backlight module 150 and the backlight module 50 is design of refractive structure. As FIG. 5 shows, a discontinuous prism refractive structure 152 is formed on the light exit surface 64 of the diffuser 54. A vertex angle of the discontinuous prism refractive structure is substantially between 90° and 120°. Via the discontinuous prism refractive structure 152, the probability of total reflection of the light may also be reduced when the light passes through the light exit surface 64, so as to increase the light coupling efficiency of the first light source 58 relative to the light guide plate 60. Furthermore, the said modification for the refractive structure on the light exit surface 64 may also change the concentration of the diffusing particles 56 doped into the diffuser 54. That is to say, based on the variation of the refractive structure on the light exit surface 64, the concentration of the diffusing particles 56 doped into the diffuser 54 may vary in a range from 0.005% to 0.1%. For example, if the continuous prism refractive structure 102 shown in FIG. 4 is formed on the light exit surface 64, the concentration of the diffusing particles 56 doped into the diffuser 54 may be preferably between 0.01% and 0.05%. In addition, if there is also an air refractive layer 104 formed between the continuous prism refractive structure 102 and the light guide plate 60 (as shown in FIG. 6), the concentration of the diffusing particles 56 doped into the diffuser 54 may be further reduced and be preferably between 0.001% and 0.005%. Similarly, if the discontinuous prism refractive structure 152 is formed on the light exit surface 64, the concentration of the diffusing particles 56 doped into the diffuser 54 may be preferably between 0.05% and 0.1%. In addition, if there is also an air refractive layer 154 formed between the discontinuous prism refractive structure 152 and the light guide plate 60 (as shown in FIG. 7), the concentration of the diffusing particles 56 doped into the diffuser 54 may be further reduced and be preferably between 0.005% and 0.01%. The light guide characteristics of the continuous prism refractive structure 102 and the discontinuous prism refractive structure 152 are not alike. The continuous prism refractive structure 102 may guide more light into the light guide plate 30, but brightness uniformity of the light guided by the continuous prism refractive structure 102 needs to be regulated by the light guide plate 60. Coupling efficiency of the light guided by the discontinuous prism refractive structure is poor, but brightness uniformity of the light guided by the discontinuous prism refractive structure 152 is better than brightness uniformity of the light guided by the continuous prism refractive structure 102. Which refractive structure to choose depends on the length of the backlight module. For example, if the length of the backlight module is less than inches, the backlight module of the present invention may utilize the continuous prism refractive structure 102 for light guiding. If the length of the backlight module is greater than 8 inches, the backlight module of the present invention may utilize the discontinuous prism refractive structure 152 for light guiding. Furthermore, the concentration of the diffusing particles 56 also depends on the length of the backlight module in the long-axis direction for making the light generated from the first light source 58 well-distributed in the diffuser 54. The length of the backlight module in the long-axis direction according to the present invention may be preferably 11 cm. However, since a diffusing intensity in unit length of the diffuser 54 is directly proportional to the concentration of the diffusing particles 56, and the amount of the light entering the light guide plate 60 is directly proportional to a diffusing distance of the diffuser 54, the concentration of the diffusing particles 56 may be further reduced when the length in the long-axis direction of the backlight module needs to be increased (such as to 20 cm) due to practical application needs.

Figure 8:
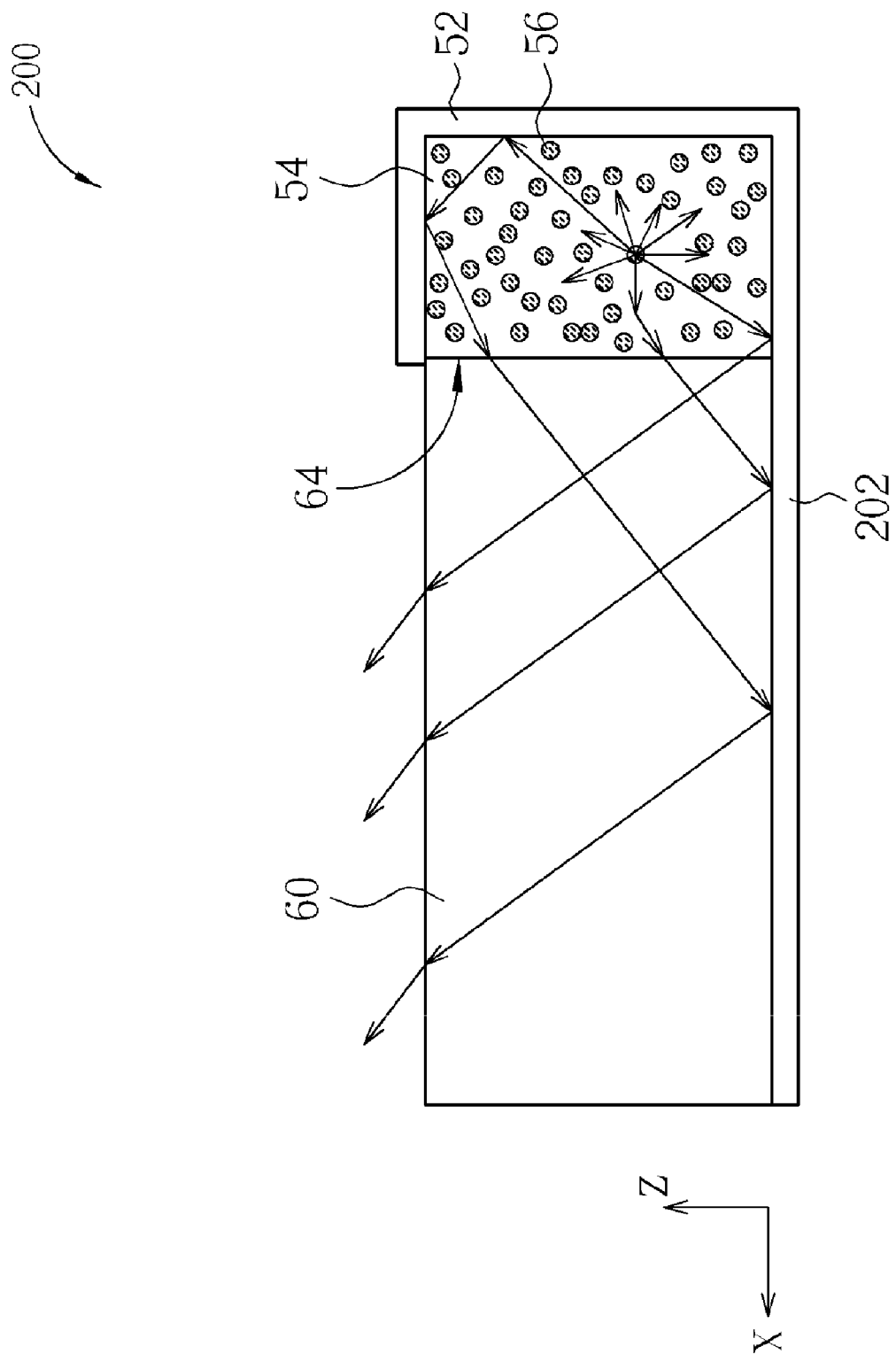
FIG. 8 is a lateral diagram of the inner structure of the backlight module according to the fourth embodiment of the present invention.

In addition, please refer to FIG. 8. FIG. 8 is a lateral diagram of an inner structure of a backlight module 200 according to a fourth embodiment of the present invention. Components mentioned in both the first and fourth embodiments represent components with similar functions or similar positions. The difference between the backlight module 200 and the backlight module 50 is design of frame. In this embodiment, the concentration of the diffusing particles 56 doped into the diffuser 54 may be preferably 0.1%. Further, as shown in FIG. 8, the frame 52 has a reflective extending section 202 connected to a side of the light guide plate 60. The reflective extending section 202 is used for reflecting light in the light guide plate 60, which is received from the diffuser 54.

Figure 9:
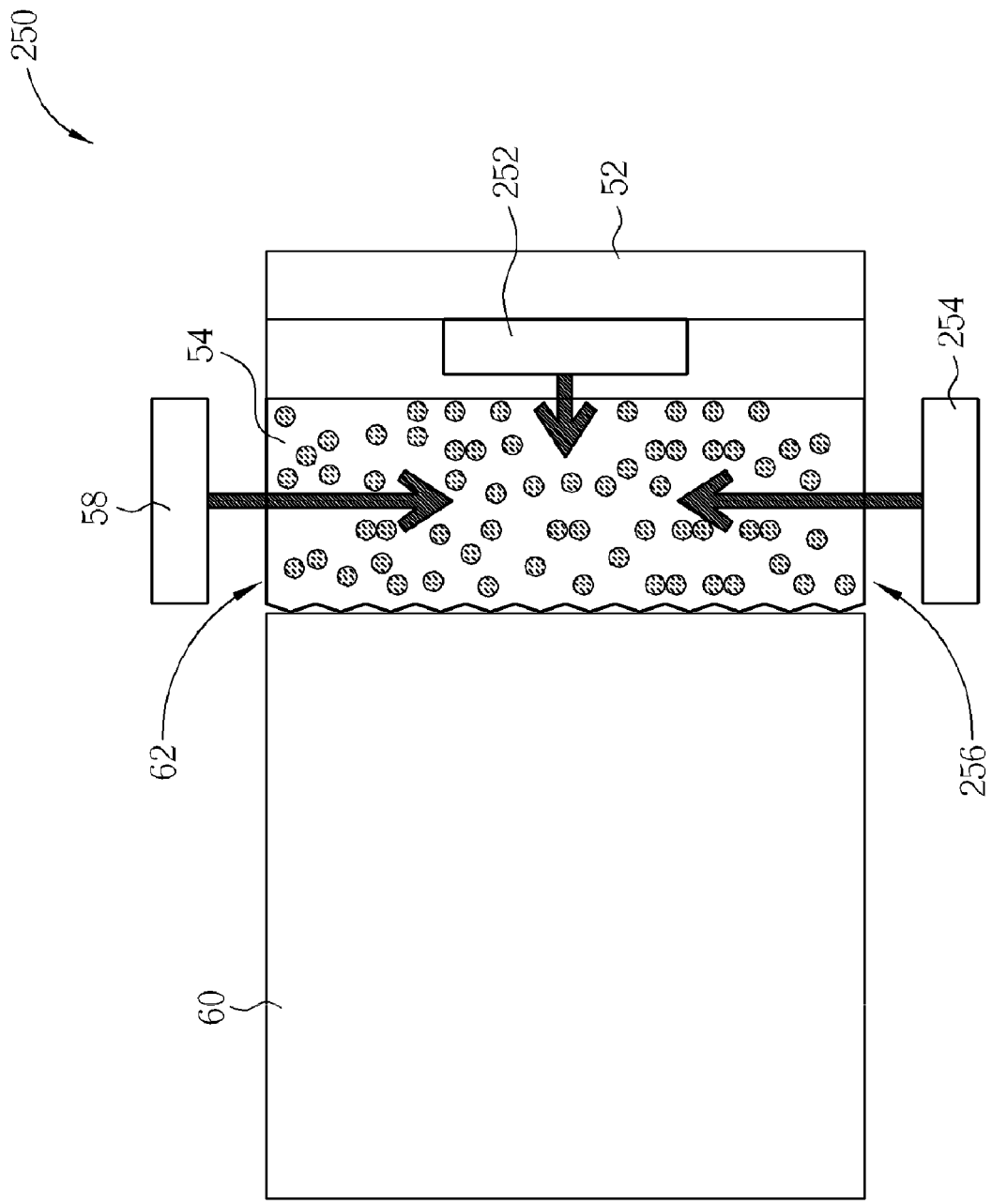
FIG. 9 is a top view of the inner structure of the backlight module according to the fifth embodiment of the present invention.

Next, please refer to FIG. 9. FIG. 9 is a top view of an inner structure of a backlight module 250 according to a fifth embodiment according to the present invention. Components mentioned in both the second and fifth embodiments represent components with similar functions or similar positions. The difference between the backlight module 250 and the backlight module 100 is disposal of light source. As shown in FIG. 9, the backlight module 250 further comprises an LED light source 252. The LED light source 252 is disposed in a short-axis direction (X-axis direction shown in FIG. 9) and located between the frame 52 and the diffuser 54. In this embodiment, the first light source 58 may be preferably a green laser light source with wavelength of about 546.1 nm, and the LED light source 252 may be a red and blue LED light source correspondingly. In such a manner, the backlight module 250 may utilize the diffuser 54 to mix light respectively emitted from the first light source 58 and the LED light source 252, so as to provide white light with high coupling efficiency, high color uniformity, and high brightness uniformity to the light guide plate 60. The said first light source 58 and the LED light source 252 may be other kinds of light sources for generating the said white light together. For example, the first light source 58 may be a blue laser light source with wavelength of about 435.8 nm, and the LED light source 252 may be a red and green LED light source correspondingly. The first light source 58 may also be a red laser light source with wavelength of about 700 nm, and the LED light source 252 may be a green and blue LED light source correspondingly. Furthermore, as shown in FIG. 9, the backlight module 250 may further comprise a second light source 254 corresponding to the first light source 58. The second light source 254 is disposed in the long-axis direction of the diffuser 54 (Y-axis direction shown in FIG. 9) and located at a side of a second light entrance surface 256 of the diffuser 54. A normal direction of the second light entrance surface 256 is substantially parallel to the long-axial direction of the diffuser 54 (Y-axis direction shown in FIG. 9). In this embodiment, the second light source 254 may also be preferably a green laser light source. In other words, the second light source 254 emits light to the diffuser 54 through the second light entrance surface 256 while the first light source 58 emits light to the diffuser 54 through the first light entrance surface 62, so that the brightness of the light incident to the light guide plate 60 may be increased accordingly. All the structural variation mentioned in the said embodiments may also be applied to the fifth embodiment. In addition, similarly, the said structural design principle mentioned in the present invention may also be applied to a front light module. Since the difference between a backlight module and a front light module is disposal of an LCD panel relative to a light source, the related description for the front light module is therefore omitted herein.

Compared with the prior art, in which a cold cathode fluorescent lamp or an LED is utilized as a light source of a backlight module or a fiber-optic tube is utilized to guide laser light into a light guide plate, the backlight module of the present invention disposes a diffuser doped with diffusing particles in a specific concentration at a side of a light guide plate. Via being scattered by the diffusing particles and reflected by the inner wall of the frame continuously, coupling efficiency and uniformity of light incident to the light guide plate may be increased. That is to say, if the backlight module of the present invention utilizes an LED (such as an RGB LED) as a light source, as mentioned above, the said poor uniformity problem of the LED in color mixing may be improved by scattering of light caused by the diffusing particles. On the other hand, if the backlight module of the present invention utilizes a laser as a light source instead, the aforementioned low coupling efficiency and poor uniformity problems of the laser light source in fiber-optic conduction may also be avoided. In addition, color display performance of the LCD may also be enhanced due to ultra high color saturation and vibrant color gamut of lasers.

Those skilled in the art will readily observe that numerous modifications and alterations of the device and method may be made while retaining the teachings of the invention.

What is claimed is:

1. A backlight module comprising:
   a frame;
   a diffuser disposed in the frame, the diffuser having a first light entrance surface and a light exit surface, a plurality of prism refractive structures being formed on the light exit surface;
   a plurality of diffusing particles doped into the diffuser, a refractive index of the plurality of diffusing particles being less than that of the diffuser;
   a first light source disposed in a long-axial direction of the diffuser and located at a side of the first light entrance surface; and
   a light guide plate disposed at a side of the light exit surface, wherein a normal direction of the first light entrance surface is substantially parallel to the long-axial direction of the diffuser, and a normal direction of the light exit surface is substantially perpendicular to the long-axial direction of the diffuser.

2. The backlight module of claim 1, wherein the plurality of prism refractive structures is formed on the light exit surface of the diffuser corresponding to the light guide plate.

3. The backlight module of claim 1 further comprising a second light source corresponding to the first light source, the second light source being disposed in the long-axial direction of the diffuser and disposed at a side of a second light entrance surface of the diffuser, a normal direction of the second light entrance surface being substantially parallel to the long-axial direction of the diffuser.

4. The backlight module of claim 1, wherein the plurality of diffusing particles is made of acrylic material.

5. The backlight module of claim 4, wherein the refractive index of the plurality of diffusing particles is substantially between 1.41 and 1.49.

6. The backlight module of claim 1, wherein the diffuser is made of acrylic material.

7. The backlight module of claim 6, wherein the refractive index of the diffuser is substantially between 1.49 and 1.6.

8. The backlight module of claim 1, wherein a concentration of the plurality of diffusing particles doped into the diffuser is between 0.005% and 0.1%.

9. The backlight module of claim 1, wherein the light guide plate and the diffuser are monolithically formed.

10. The backlight module of claim 9, wherein the light guide plate and the diffuser are monolithically formed in an injection molding manner.

11. The backlight module of claim 1, wherein two adjacent prism refractive structure are continuous.

12. The backlight module of claim 11, wherein a vertex angle of the prism refractive structure is substantially between 140° and 160°.

13. The backlight module of claim 11, wherein a concentration of the plurality of diffusing particles doped into the diffuser is between 0.01% and 0.05%.

14. The backlight module of claim 11, wherein an air refractive layer is formed between the plurality of prism refractive structures and the light guide plate.

15. The backlight module of claim 14, wherein a concentration of the plurality of diffusing particles doped into the diffuser is between 0.001% and 0.005%.

16. The backlight module of claim 1, wherein two adjacent prism refractive structures are discontinuous.

17. The backlight module of claim 16, wherein a vertex angle of the prism refractive structure is substantially between 90° and 120°.

18. The backlight module of claim 16, wherein a concentration of the plurality of diffusing particles doped into the diffuser is between 0.05% and 0.1%.

19. The backlight module of claim 16, wherein an air refractive layer is formed between the plurality of prism refractive structures and the light guide plate.

20. The backlight module of claim 19, wherein a concentration of the plurality of diffusing particles doped into the diffuser is between 0.005% and 0.01%.

21. The backlight module of claim 1, wherein the frame has a reflective extending section connected to a side of the light guide plate for reflecting light received from the diffuser in the light guide plate.

22. The backlight module of claim 1, wherein an inner wall of the frame is a reflective surface.

23. The backlight module of claim 1, wherein the first light source is a laser light source.

24. The backlight module of claim 23 further comprising an LED (Light Emitting Diode) light source disposed in a short-axial direction of the diffuser and disposed between the diffuser and the frame.

25. The backlight module of claim 1, wherein the first light source is an RGB LED light source.

26. The backlight module of claim 1, wherein a diameter of each diffusing particle is between 3 μm and 12 μm.

* * * * *